No. 632,656. Patented Sept. 5, 1899.
G. G. LEWIS.
INSULATING APPARATUS.
(Application filed July 18, 1898.)
(No Model.) 2 Sheets—Sheet 1.
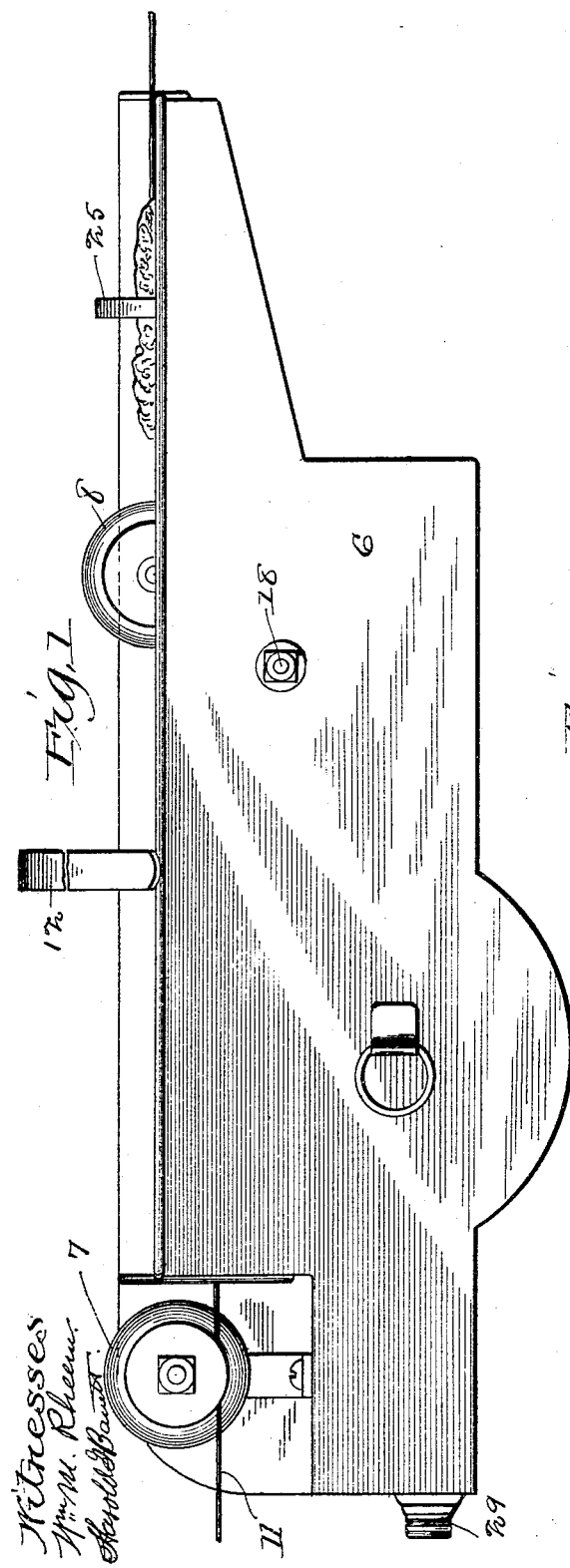
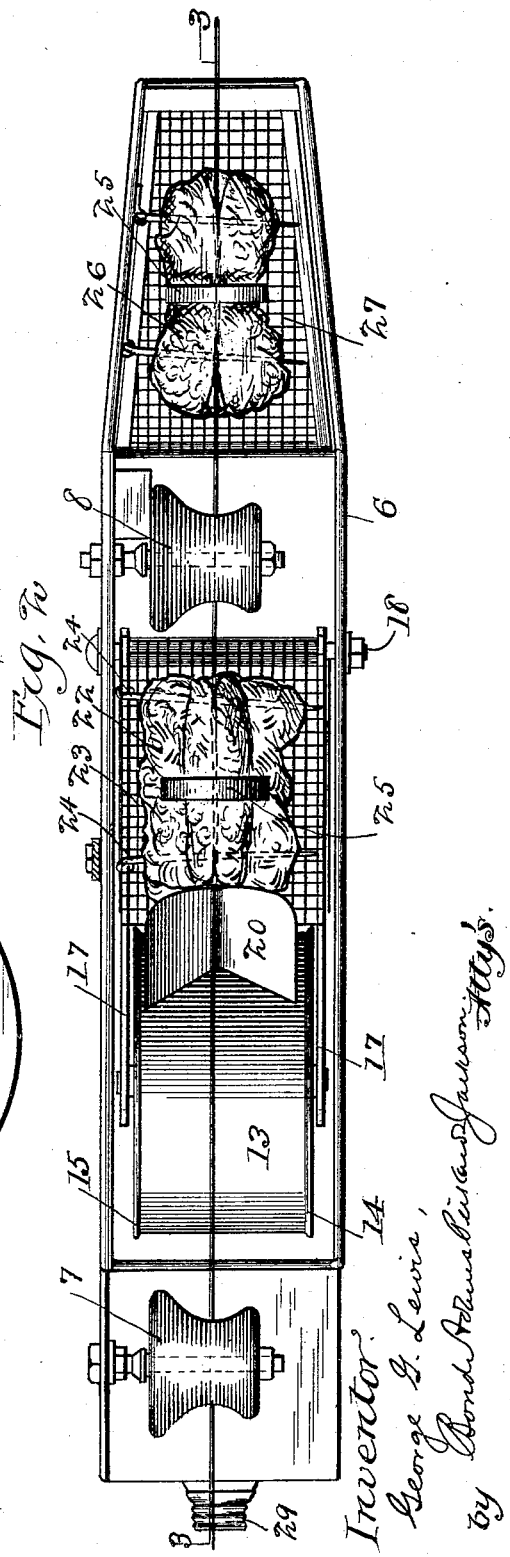

No. 632,656. Patented Sept. 5, 1899.
G. G. LEWIS.
INSULATING APPARATUS.
(Application filed July 18, 1898.)
(No Model.) 2 Sheets—Sheet 2.
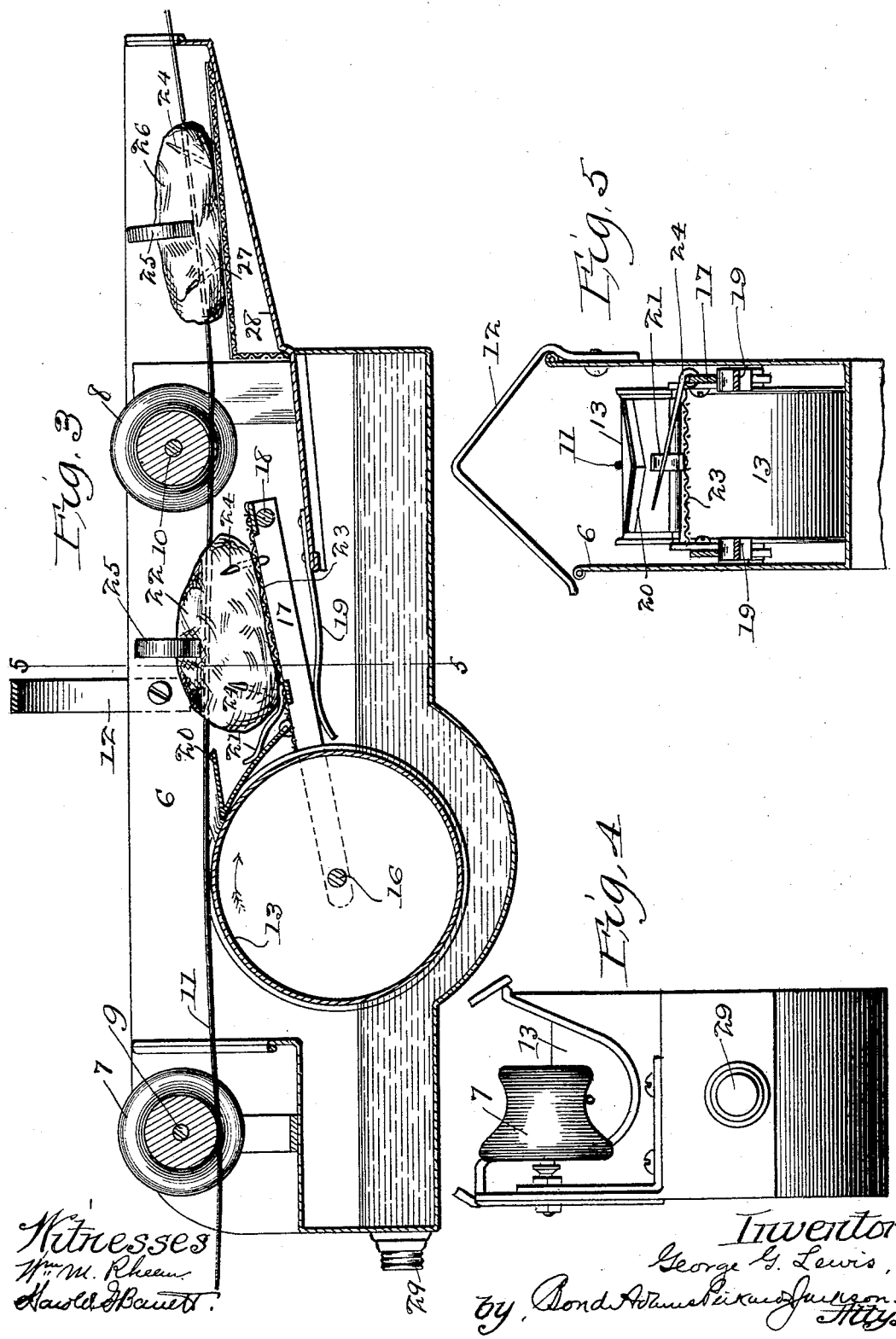

UNITED STATES PATENT OFFICE.

GEORGE G. LEWIS, OF SYCAMORE, ILLINOIS, ASSIGNOR TO HIMSELF AND WILLIAM A. BUEHL, OF SAME PLACE.

INSULATING APPARATUS.

SPECIFICATION forming part of Letters Patent No. 632,656, dated September 5, 1899.

Application filed July 18, 1898. Serial No. 686,201. (No model.)

*To all whom it may concern:*

Be it known that I, GEORGE G. LEWIS, a citizen of the United States, residing at Sycamore, in the county of De Kalb and State of Illinois, have invented certain new and useful Improvements in Insulating Apparatus, of which the following is a specification, reference being had to the accompanying drawings.

My invention relates to apparatus for coating or recoating wires with insulating material in liquid form, and has for its object to provide certain improvements in apparatus of the type illustrated and described in my application for Letters Patent filed January 3, 1898, Serial No. 665,191. Such apparatus consists, in general, of a suitable tank or reservoir which carries the liquid paint, a conveyer arranged in the reservoir and partially submerged in the paint, which by the rotation of the conveyer is carried up and discharged upon the wire, suitable suspending devices for suspending the apparatus from the wire, and a wiper for wiping the wire after the paint has been applied to it. In practice the apparatus is placed upon and drawn along the wire, the paint being automatically applied as the apparatus progresses. The improvements which form the subject-matter of the present application relate more especially to the construction and operation of the conveyer and the manner of mounting it in position and also to the arrangement of the wipers, as will be hereinafter set forth.

In the accompanying drawings, Figure 1 is a side elevation. Fig. 2 is a plan view. Fig. 3 is a longitudinal section. Fig. 4 is an end view, and Fig. 5 is a vertical cross-section on line 5 5 of Fig. 3.

Referring to the drawings, 6 indicates a reservoir, which is of suitable shape to contain the parts of the apparatus and carries at its upper portion near its ends rollers 7 8, mounted upon suitable spindles 9 10, respectively, which rollers are adapted to run upon a wire 11, which is to be coated, as shown in Fig. 3. The spindles 9 10, as shown in Figs. 2 and 4, are secured at one end only in order to permit the rollers to be placed upon the wire readily.

12 indicates an arm which is secured to one side of the apparatus and extends over the wire, as shown in Fig. 5, in position to engage it should the roller 7 or 8 slip off of it, thereby preventing the apparatus from falling.

13 indicates a conveyer, which in the form of apparatus herein shown is a wheel having a smooth periphery with flanges 14 15 at its opposite edges, as shown in Figs. 2 and 3. The conveyer 13 is mounted upon a pivot 16, carried by a swinging frame 17, as shown in Fig. 3, the frame 17 being mounted upon a pivot 18, which is secured in the opposite sides of the case or reservoir. By this construction the conveyer is adapted to be moved vertically and therefore to yield, as may be necessary, to permit the apparatus to pass knots or other obstructions in the wire. The upper portion of the conveyer 13 is held in constant contact with the lower part of the wire by a spring 19, which is suitably secured to the case and exerts an upward pressure upon the frame 17, as shown in Fig. 3. The specific form of spring 19 is not material, as any suitable spring which will accomplish the purpose may be used. Neither is the specific form of conveyer shown the only one which may be used, as instead of a solid wheel an endless belt or other equivalent device may be employed. The conveyer 13 is located at a convenient point between the rollers 7 8, as shown in Fig. 3.

For the purpose of removing the paint carried up by the carrier and discharging it upon the wire a scraper 20 is employed, the upper face of said scraper being trough-shaped or concave, so that the greater portion of the paint will be discharged directly upon the wire. The scraper bears against the upper portion of the conveyer, as shown in Figs. 2 and 3, and as said conveyer rotates in the direction indicated by the arrow in Fig. 3 by reason of the friction between the conveyer and the wire the paint is scraped from its periphery by the scraper and is directed in a stream upon and around the wire. In order that the scraper may remain in contact with the conveyer notwithstanding the movement thereof, it is also mounted upon the frame 17, as shown in Fig. 3, and is held yieldingly in contact with the periphery of the conveyer by a spring 21.

22 indicates a wiper which serves to wipe the wire after the paint has been applied to it, said wiper being mounted upon a perforated plate or wire-gauze 23, carried by the frame 17 and having a slot through which the wire 11 passes. The wiper 22, which is preferably a sponge, is held in place by pins 24, which pass through it and are secured to the case. In order to hold the wiper or sponge closely upon the wire, a spring-clamp 25 is provided, which is placed over the upper portion of the wiper and nips or binds its free edges together sufficiently to enable it to properly wipe the wire. The clamp 25 serves also to prevent the wiper from accumulating an excess of the paint, as it squeezes out the surplus paint and permits it to return to the reservoir through the wire-gauze.

26 indicates a second wiper, which is similar to the wiper 22 and is mounted at the rear end of the apparatus upon a wire-gauze or perforated plate 27, as shown in Fig. 3. The said wiper is also provided with a clamp 25. The paint which drips from the wire-gauze 27 is received upon an inclined plate 28, which forms the bottom of the rear end of the apparatus, and is thereby conducted back to the reservoir.

29 indicates a screw-cap which is placed at one of the ends of the reservoir for the purpose of permitting it to be emptied.

In operation the reservoir is partly filled with paint, and it is then placed upon the wire in the manner illustrated in Fig. 3, after which it is drawn along in the direction indicated by the arrow in Fig. 3. The paint is thereby carried up by the conveyer and discharged from it upon the wire by the scraper 20, after which the wire is wiped first by the wiper 22 and then by the wiper 26, the wipers serving also to uniformly spread the paint over the surface of the wire and prevent it from dripping. When the conveyer strikes a knot or other obstruction in the wire, it is depressed thereby sufficiently to permit of its passage and then it is returned to its operative position by the spring 19.

That which I claim as my invention, and desire to secure by Letters Patent, is—

1. In a painting apparatus, the combination with a reservoir, of a paint-conveyer for conveying paint from the reservoir to the wire, said conveyer being adapted to yieldingly engage the wire, and means for discharging the paint from said conveyer in a stream upon the wire, substantially as described.

2. In a painting apparatus, the combination with a reservoir, of a paint-conveyer for conveying paint from the reservoir to the wire, said conveyer being adapted to yieldingly engage the wire, and a scraper adapted to scrape the paint from said conveyer and discharge it upon the wire, substantially as described.

3. In a painting apparatus, the combination with a reservoir, of a paint-conveyer adapted to convey paint from the reservoir to the wire, said conveyer being adapted to yieldingly engage the wire, and a scraper adapted to scrape paint from the conveyer and discharge it upon the wire, said scraper being arranged to move with the conveyer, substantially as described.

4. In a painting apparatus, the combination with a reservoir, of a paint-conveyer, a pivoted frame in which said conveyer is mounted, a spring for holding said conveyer yieldingly in operative position and means for discharging the paint from said conveyer in a stream upon the wire, substantially as described.

5. In a painting apparatus, the combination with a reservoir, of a paint-conveyer, a pivoted frame in which said conveyer is mounted, a spring for holding said conveyer yieldingly in operative position, and a scraper carried by said frame and engaging said conveyer, substantially as described.

6. In a painting apparatus, the combination with a reservoir, of a paint-conveyer, a pivoted frame in which said conveyer is mounted, a spring for holding said conveyer yieldingly in operative position, a scraper carried by said frame and engaging said conveyer, and a wiper carried by said frame, substantially as described.

7. In a wire-painting apparatus, the combination with means for applying paint to the wire, of a wiper having a slot or channel through which the wire passes, and a clamp for holding the wiper in engagement with the wire, substantially as described.

8. In a painting apparatus, the combination with means for applying paint to the wire, of a wiper having a slot through which the wire passes, and a spring-clamp which engages the wiper at opposite sides of said slot and binds it upon the wire, substantially as described.

9. In a painting apparatus, the combination with means for applying paint to the wire, of a wiper having a slot through which the wire passes, a spring-clamp which engages the wiper at opposite sides of said slot and binds it upon the wire, a paint-reservoir, and means for conducting the surplus paint back to the reservoir, substantially as described.

GEORGE G. LEWIS.

Witnesses:
JOHN L. JACKSON,
HOLMES A. TILDEN.